No. 697,479. Patented Apr. 15, 1902.
T. H. HARDCASTLE.
DISK SEED PLANTER.
(Application filed Dec. 31, 1900.)
(No Model.) 2 Sheets—Sheet 1.
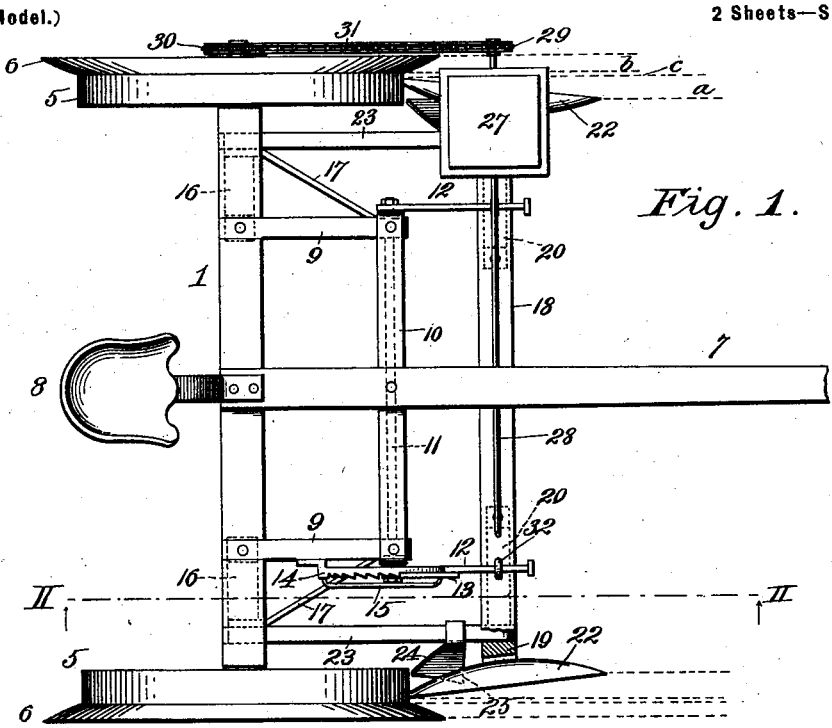
Fig. 1.
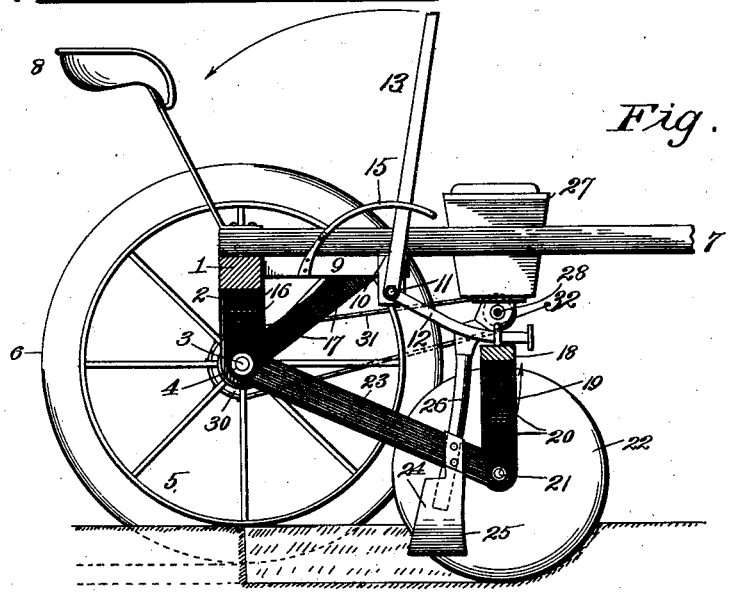
Fig. 2.
Fig. 3.
Witnesses:
H. C. Rodgers
H. Thorpe
Inventor
Thomas H. Hardcastle
By Fischer & Thorpe
Attys.
THE NORRIS PETERS CO., PHOTO-LITHO., WASHINGTON, D. C.

No. 697,479. Patented Apr. 15, 1902.
T. H. HARDCASTLE.
DISK SEED PLANTER.
(Application filed Dec. 31, 1900.)
(No Model.) 2 Sheets—Sheet 2.
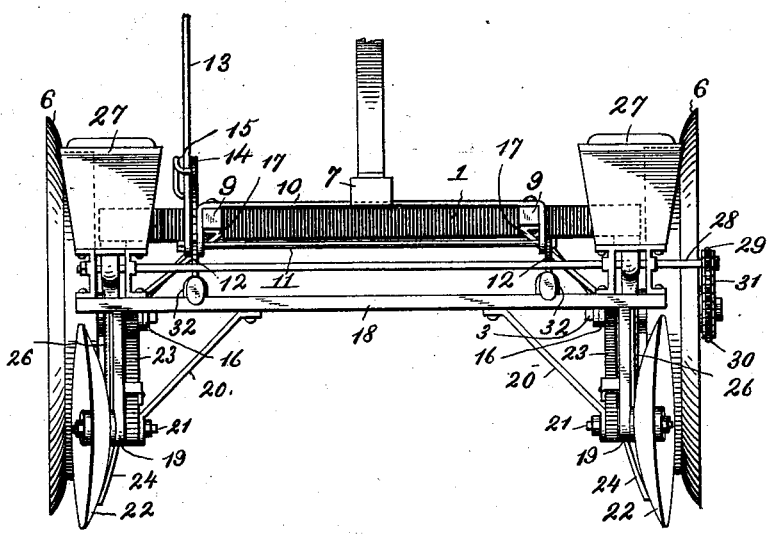
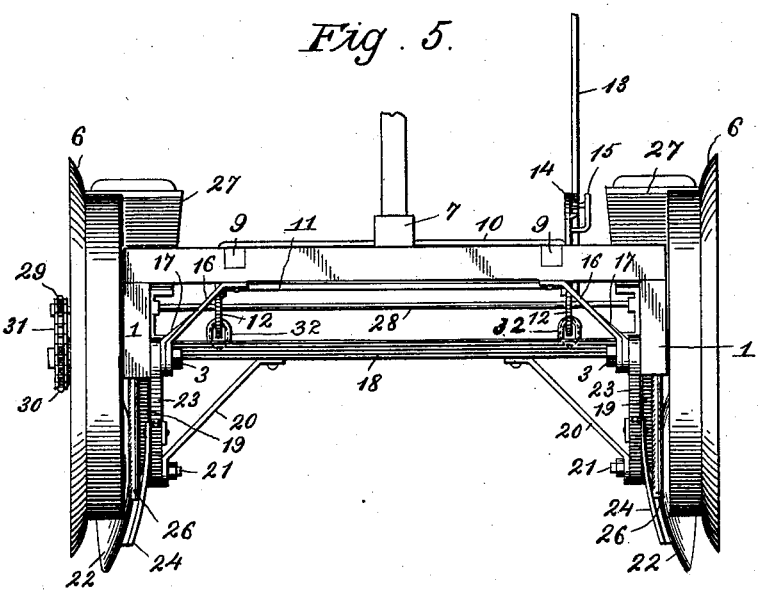
Witnesses:
Arthur McArthur
H. C. Rodgers
Inventor:
Thomas H. Hardcastle
By Fischer & Thorpe
Attys.

UNITED STATES PATENT OFFICE.

THOMAS H. HARDCASTLE, OF MOBERLY, MISSOURI.

DISK SEED-PLANTER.

SPECIFICATION forming part of Letters Patent No. 697,479, dated April 15, 1902.

Application filed December 31, 1900. Serial No. 41,729. (No model.)

*To all whom it may concern:*

Be it known that I, THOMAS H. HARDCASTLE, a citizen of the United States, residing at Moberly, Randolph county, Missouri, have invented a new and useful Disk Seed-Planter, of which the following is a specification.

My invention relates to disk seed-planters; and my object is the provision of a machine which shall form two parallel furrows, plant the seed in one and cover it, and utilize the other as a means of drainage and to admit light and air to the seed that the germinative process shall be facilitated and the crop possess the advantages resulting therefrom.

A further object is the production of a machine which is efficient in operation, under the perfect control of the driver, and which can be manufactured cheaply.

With these general objects in view and others, as hereinafter appear, the invention consists in certain novel and peculiar features of construction and organization, as hereinafter described and claimed, and in order that it may be fully understood reference is to be had to the accompanying drawings, in which—

Figure 1 represents a top plan view of a seed-planter embodying my invention. Fig. 2 is a vertical longitudinal section of the same, taken on the line II II of Fig. 1 and showing a part of one of the inner furrows made by the disks. Fig. 3 is an enlarged front view showing the relative positions of the disks which make the inner furrows and of the covering-wheels provided with sharpened cutting-flanges which make the outer furrows and incidentally insure the filling of the inner furrows. Fig. 4 is a front view of the machine. Fig. 5 is a rear view of the same.

In the said drawings the frame is constructed as follows, though it is to be understood that the particular construction is unimportant and immaterial as far as the important function of this machine is concerned and that for this reason I do not confine myself to the construction herein shown and described.

1 designates a cross-beam or axle provided with vertically-depending arms 2 at its ends, in which are mounted stub-axles 3, preferably clamped in position at their ends by nuts 4, and upon these stub-axles are journaled in the usual or any preferred manner the drive-wheels 5, having a broad periphery or tread-surface and an annular cutting-flange 6 at the outer margins of the tread-surface. By preference these cutting-flanges will be beveled at their inner sides only, as shown clearly in Figs. 1 and 3, and are adapted as the machine is drawn across the field to form parallel furrows *b* of substantially the form shown in Fig. 3.

Projecting forward from the center of cross-beam 1 is the tongue 7, to which the draft-animals are adapted to be hitched in the usual manner, and supported from the rear end of the tongue is the seat 8.

9 designates forwardly-projecting arms secured to cross-beam 1, and 10 a cross-bar or plate resting upon the forward ends of said arms and secured to the under side of the tongue and forming a support for the latter. The ends of said bar are bent vertically downward below arms 9, so as to form a journal for the rock-shaft 11, and secured rigidly upon the ends of said rock-shaft in any preferred manner are forwardly-projecting arms 12 and an upwardly-projecting lever 13, the latter being adapted to engage one tooth or another of the sector 14, secured to the adjacent arm 9 and provided with a guide-arm 15 for the lever. In lieu of this particular construction it is obvious that the lever may be provided with the usual pawl-and-ratchet device for securing it at the desired point of adjustment, but which, being of well-known construction, need not be illustrated or described in this connection.

16 designates inclined braces extending divergingly from the under side of cross-beam 1 to the lower ends of depending arms 2 to brace the latter, and 17 braces for the forward ends of arms 9, the last-named braces extending convergingly upward from the lower ends of arms 2 to the forward ends of arms 9.

The disk-frame consists, preferably, of cross-bar 18, underlying the tongue some distance and provided with vertically-depending arms, 19, braced rigidly by inclined braces 20, extending from the lower ends of said arms upwardly and inwardly to the under side of cross-bar 18, and journaled upon the outer ends of stub-shafts 21, secured to the lower ends of arms 20 in any suitable manner, are the disks 22, said disks having their cutting edges lying within the margins of the tread-surfaces of the wheels, but projecting inwardly at the proper angle to form the furrows a of the requisite width, which furrows by preference are somewhat deeper than the outer and parallel furrows b, as shown in Fig. 3.

The lower ends of arms 19 of the disk-frame are pivotally linked by braces 23 to the stub-axles of the drive-wheels, and secured to said link-braces, as shown or in any other suitable or preferred manner, are the drill-shoes 24, the same projecting downwardly at a slight angle with respect to the inner faces of the disks and having their front edges, as at 25, fitting snugly against the disks, the arrangement being such that the shoes serve at once to scrape the earth from the disks and hold it back at the inner side of the furrow until the seed has been properly deposited therein. The seed is dropped into the V-shaped space between these disks and the substantially flat drill-shoe by the seed-tube 26, extending upward at the rear side of bar 18 and arranged to receive the seed as it is dropped from seedboxes 27, supported upon the disk-frame in the usual or any preferred manner, and provided with the usual or any preferred type of seed-dropping device, which embody a shaft 28, this shaft being driven through the medium of a sprocket-wheel 29 thereon, sprocket-wheel 30, secured to one of the drive-wheels, and a chain 31, connecting said sprocket-wheels, and in order that the disk-frame may be raised to inoperative position in traveling to or from the field or to avoid obstructions in the path of the disks or for any other reason the frame is preferably provided with the staples or loops 32, through which arms 12 of the rock-shaft slidingly extend, by which arrangement it is obvious that the driver by the proper manipulation of lever 13 can raise and lower the operative parts of the machine at will.

In practice as the machine is drawn forward over the field four parallel furrows are made, these furrows being arranged in pairs, with the inner or disk furrows a of each pair of greater depth than the outer or flange furrows b, the disks of course cutting all sod, clods, or earth lying in their path. Now as the machine proceeds the seed is dropped in the usual manner to the bottom of furrows a, the shoes holding the earth back at the inner sides of the furrows until the seeds are properly deposited, when more or less earth will fall in upon them. The cutting-flanges, following closely in the wake of the disks, make the outer furrows b, and because said furrows are very close to furrows a force the interposed walls of earth c inwardly and cause them to fill furrows a, the bevel of the cutting-flanges positively insuring this operation and packing the earth with more or less solidity by their beveled sides, the tread-surface of the wheels of course packing the earth vertically down in the furrows a in the usual manner.

The machine leaves in its wake two shallow furrows b, which of course in practice will be partially filled with loose earth falling therein after the passage of the machine, the provision of which furrows is of advantage because they provide for draining off the surplus water from and for the admission of light and air to the seed in order that the germinative action may take place to the best advantage. In wet weather, where the seed is covered so completely that the air is excluded, it frequently occurs that the condensed earth smothers and materially injures the seed. With this method of planting the warmth of the sun's rays and the air will always have access to the seed, and there will be no possibility of the latter being smothered. While making provision for the access of air and light to the seed and the drainage of surplus water therefrom, the seed is as fully protected from field mice as in the usual method of planting, because it is covered from the side by at least an inch of earth packed with a fair degree of solidity by the beveled sides of the cutting-flanges.

By means of the lever for raising and lowering and the means for holding the lever at the desired point of adjustment it is obvious that the depth of cut of the disks may be regulated and a uniform depth of cut be insured. The driver may regulate the depth of cut according to the conditions of the soil in which he is to operate, as in some soils it will be found preferable to sow the seed at a greater depth than in others. It is to be understood also that this machine is capable of and is intended for planting seed at a uniform depth without previously preparing the ground by harrowing or otherwise, as harrowing packs the earth and makes it hold water, whereas my machine leaves the earth mellow and in condition to absorb the warmth of the sun, one of the principal factors in the germination of the seed.

While the drawings show the invention as arranged for planting corn, it is to be understood that its principle of action may be applied in planting wheat or other grain, the disks and wheels being arranged in the same relative positions, although the style or form may vary greatly.

From the foregoing it will be apparent that I have produced a machine which possesses the features of advantage enumerated as desirable in the statement of invention and that it also combines simplicity, strength, and durability of construction. It is to be understood, however, that while I have shown and described the preferred embodiment of the invention various changes may be resorted to in its form, detail construction, arrangement, and proportions of the parts without departing from the spirit or sacrificing any of the advantages of the invention.

Having thus described the invention, what

I claim as new, and desire to secure by Letters Patent, is—

1. In a seed-planting machine, a suitable frame, means carried thereby for forming parallel furrows in the ground and for dropping seed in said furrows, means also carried by said frame for making companion parallel furrows and incidentally filling the first-named furrows with the displaced earth, and means for pressing or packing down the earth thus filled in said first-named furrows, substantially as described.

2. In a seed-planting machine, a suitable frame, cutting-disks journaled therein and adapted to furrow the ground in parallel lines, seed-dropping devices mounted on the frame, shoes adjacent to the disks to hold back the earth and insure the deposit of the seed at the proper depth in the furrow, drive-wheels mounted on the frame, and following in the wake of the disks, and comprising flanges which open up furrows outward of and parallel with the disks furrows and incidentally fill in the furrows of the latter after the seed is dropped therein, and tread-surfaces which pack the earth in the disk-furrows thus filled, substantially as described.

3. In a seed-planting machine, a suitable frame, a secondary frame in front of and pivotally linked to the main frame, means to raise and secure said secondary frame at the desired point of adjustment, furrow-making devices secured to the secondary frame, seed-dropping devices, shoes to insure the deposit of the seed at the proper depth in the furrows made by said furrow-making devices, means for making companion parallel furrows and incidentally filling the first-named furrows with the displaced earth, and means for pressing or packing down the earth thus filled in said first-named furrows, substantially as described.

4. In a seed-planting machine, a suitable frame, a secondary frame in front of and pivotally linked to the main frame, means to raise and secure said secondary frame at the desired point of adjustment, furrow-making devices secured to the secondary frame, seed-dropping devices, shoes to insure the deposit of the seed at the proper depth in the furrows made by said furrow-making devices, and wheels for operating the seed-dropping devices and comprising a tread-surface, and an annular cutting-flange of greater diameter than the wheel proper and adapted to make a furrow parallel with the first-named furrows and fill the latter with the displaced earth, the said tread-surface being adapted to press or pack down the earth thus filled in, substantially as described.

In testimony whereof I affix my signature in the presence of two witnesses.

THOMAS H. HARDCASTLE.

Witnesses:
JOHN T. COX,
S. W. HOLT.